Nov. 8, 1960    J. PAVLECKA    2,959,383
AIRFOIL STRUCTURE
Original Filed May 15, 1956    2 Sheets-Sheet 1
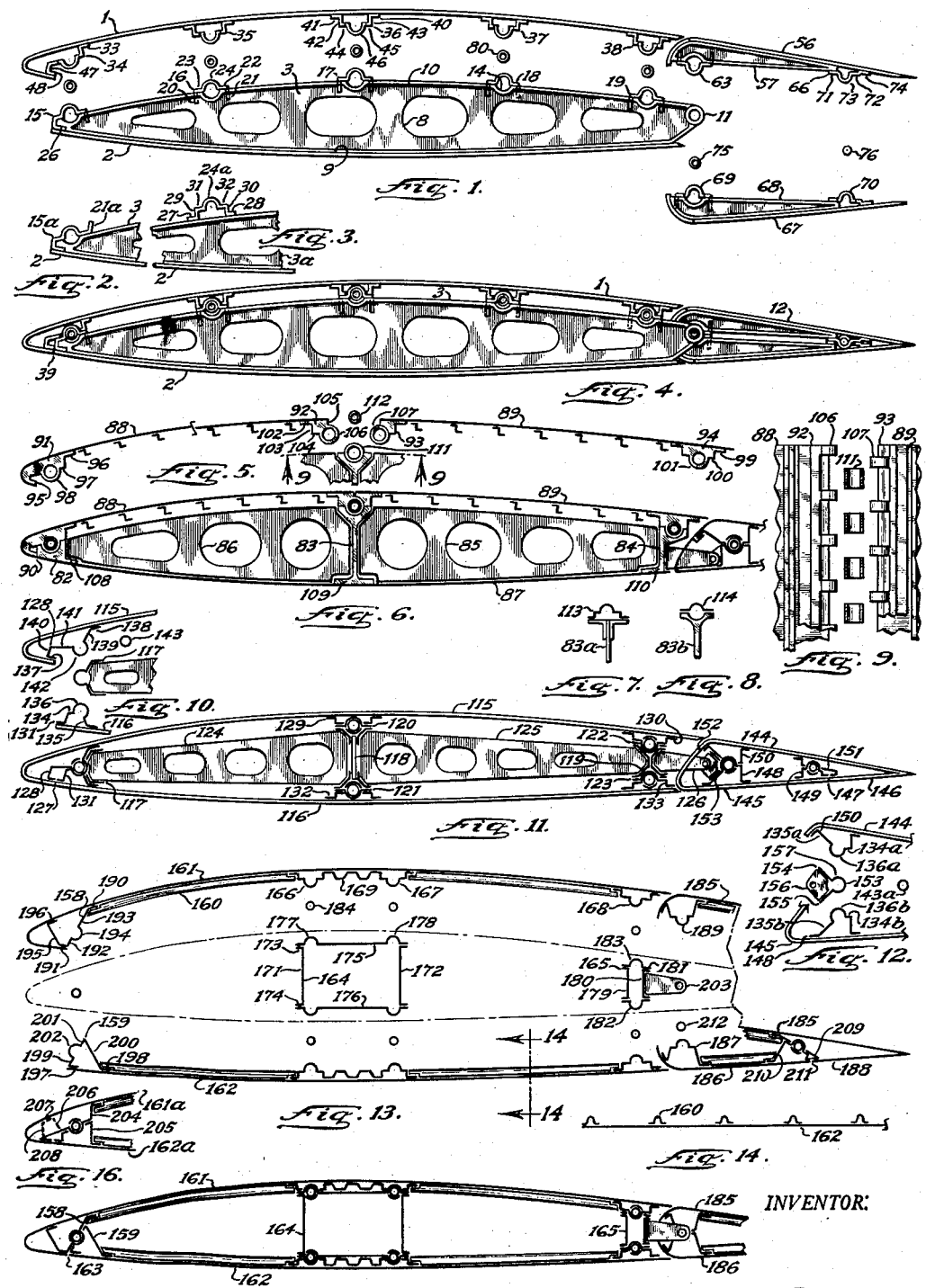
INVENTOR:
John Pavlecka

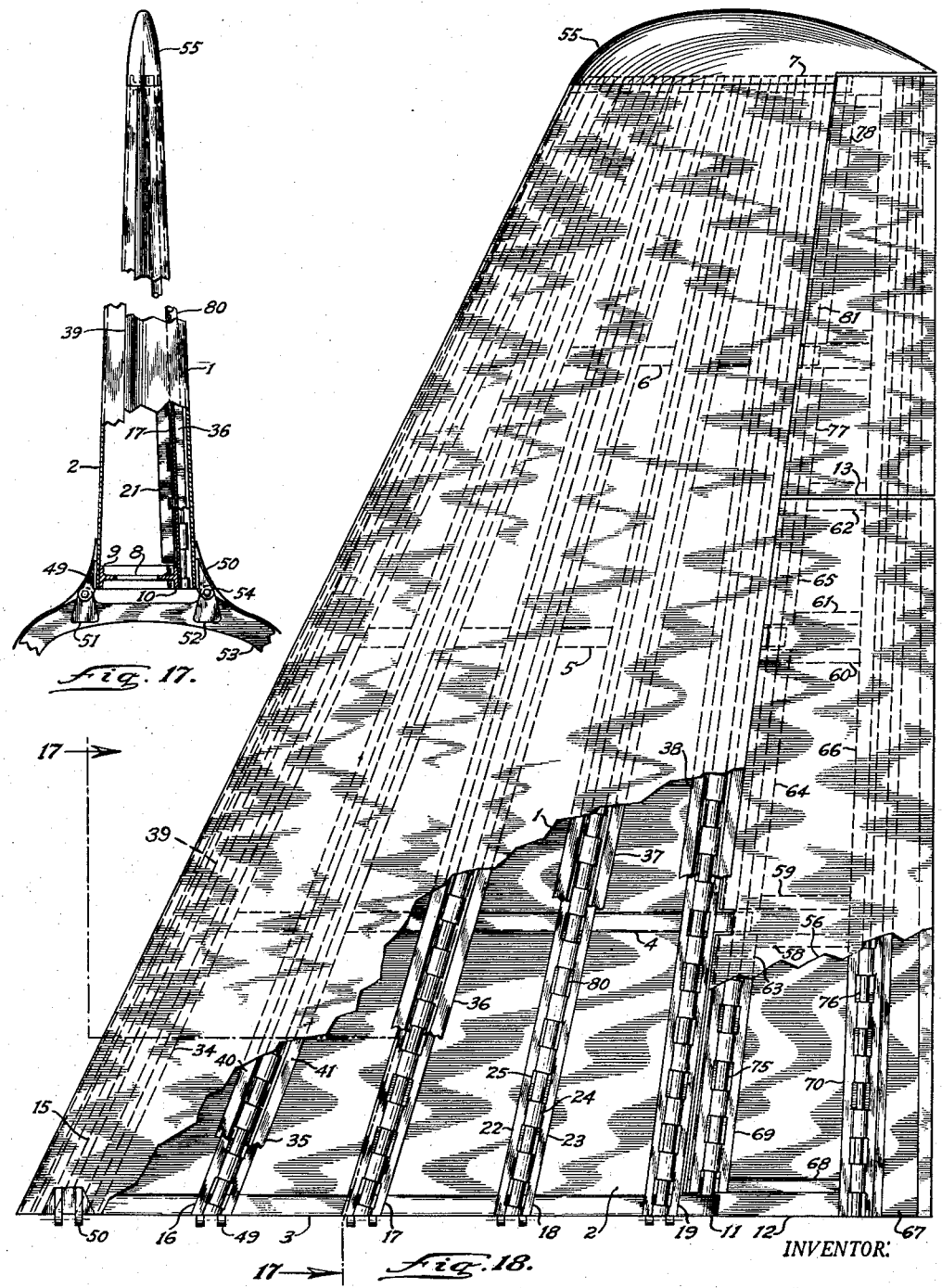

2,959,383
Patented Nov. 8, 1960

2,959,383

AIRFOIL STRUCTURE

John Pavlecka, 8797 Capital, Oak Park 37, Mich.

Continuation of application Ser. No. 585,112, May 15, 1956. This application Dec. 26, 1957, Ser. No. 706,229

22 Claims. (Cl. 244—124)

This invention relates to structures comprising a shell of an elongated cross-section, closed at either one or both of its profile ends and supported by interior stress members, and which is particularly well applicable to airfoil bodies of all kinds such as airplane wings, control surfaces, helicopter blades, etc.

The subject matter of this invention is the same as that of my applications Serial Nos. 205,785 and 585,112, filed January 12, 1951 and May 15, 1956, respectively, both of which were abandoned after their allowance, and is related to the subject matter of my following applications: Airfoil Structure Ser. No. 708,339, filed January 9, 1958. Airfoil Structure Ser. No. 749,005, filed July 16, 1958.

One object of my present invention is to devise a structure of the above specified type which can be fabricated as a number of units or subassemblies with full accessibility, and then assembled, or later on taken apart for inspection or repair, with ease and speed.

Another object resides in devising a structure for inaccessible hollow or tubular bodies of all kinds, of which airplane wings are an outstanding example, which permits open fabrication of such bodies as independent subassemblies so that joining processes, such as adhesive bonding and spot welding, affording a smooth and true contour, can be made use of to the fullest extent.

Yet another object is a structure for wings and other airfoil bodies wherein—contrary to fabricating limitations and lack of accessibility now extant—the widest sheets and plates now available can be utilized for the airfoil shell, and the number of seams and chinks can thus be reduced to a minimum.

A still further object resides in devising an airfoil or similar structure so that it possesses high producibility combined with an advantageous strength-to-weight ratio because of the feasibility of substitution of better processes for riveting and consequent use of stress members not weakened by countless rivets as well as elimination of the rivets themselves.

An object of substantial utility is a wing structure in which a portion or all of the "skin" is removable, and in case of damage replaceable, so that installation and servicing of fuel tanks and controls in the wing is simplified and a multitude of the usual access doors and covers eliminated.

A basic object is an airfoil or similar body consisting of a shell wherein one panel is continuous over one whole shell side and around one or both shell profile ends, and another panel complements it on the opposite side, and spanwise stringers as auxiliary stress members on both panels carry key-engaging elements and are interlocked with one another by linear keys to effect a demountable assembly of the shell in which the interlocked stringers and the keys function as the main supporting members or spars.

Another object is a two-panel shell structure of the stated type in which either individual supporting members are employed, or a framework of such members, and the members serve as carriers of key-engaging elements and are key-locked to either one or both of the shell panels by means of auxiliary stress members in the form of stringers on the panel or panels, which stringers also carry key-engaging elements.

Yet another object resides in a provision, in the above introduced two-panel shell structure held in demountable unity by interlocking keys, of abutment faces or other means on the stringers and on the supporting members therein for blocking them against relative motion and with pre-loading forces in their opposed and juxtaposed interlocked relationships, thereby rendering the structure rigid and cohesive.

A structure fulfilling the objectives and provisions above set forth is characterized, in a generalized form, by a shell of an elongated profile and of a finite length or span; the shell is constituted of two panels or panel units, one of which—usually on the dorsal side in the case of an airfoil where smoothness and continuity are very important—forms the whole shell side and is continuous from that side around one or both closed profile ends or airfoil extremities of the shell to its other, or ventral, side whereat it meets edge-to-edge or thickness-to-thickness with and is complemented by the other panel or panel unit at a lengthwise or spanwise seam; this seam is located at a distance from the closed profile end or ends of the shell, and appears as a line on the shell surface; such a dividing seam or juncture is referred to in all metal and plastic forming trades and in designing and lofting arts as the parting line, and is identified as such in all the embodiments of my invention herein further disclosed.

In its interior, the shell is braced by stringers running lengthwise or spanwise therein and functioning as supporting stress members and, furthermore, according to my present invention, the shell panels are held in separable unity with each other at their parting line by such stringers functioning also as carriers of key-engaging means, and are held in separable unity with each other by key-locked stringers at a location or locations apart from the parting line; in certain embodiments, the shell panels may be held in separable unity with each other as well as with interjacent individual supporting members or a framework thereof by means of the same keys which interlock the stringers on the panels with one another, and may be held in unity with such supporting members or a framework thereof by additional key-locked stringers located intermediate those on the two panels.

To this end, both of the panels or panel units are provided on their inner side at and along the parting line with stringers in a side-by-side or juxtaposed relationship with each other, and are provided with one or more of pairs of opposedly alined stringers apart from the parting line; in embodiments employing additional individual supporting members, or a framework made up of such members, these members are likewise provided with lengthwise or spanwise stringers, referred to as "caps," which extend in opposed alinement with stringers on the panels intermediate the stringers in juxtaposition and in opposition on them; a framework of supporting members attached separably to both of the panels includes also fore and aft spars in lateral alinement with the stringers in juxtaposition and in opposition on the panels; all such stringers, caps and spars are the carriers for their respective structural components of means for cojoining them with one another by means of linear keys, such as tubes, rods or prisms; the cojoining means functions by holding onto or engaging slidably the keys which are slid inbetween the alined stringers, caps and spars in their various associations, through one lengthwise or spanwise shell extremity, and are withdrawable the same way.

The key-holding or engaging means carried by the stringers, caps or spars can be of any kind or type capable of performing that function jointly with one or more like means; the type employed in the various embodiments hereinfurther disclosed consists of a series of longitudinal archways on each stringer, cap or spar, the archways being interrupted by clearance spaces or recesses of a size capable of accommodating the archways of one or more of associated members; such archways on all the members associated with one another are staggered lengthwise so that they interfit into a near axial alinement with one another; a linear key telescoped into the archways so alined draws them into a true alinement and interlocks them, the associated stringers, caps and spars, as well as the panels and individual stress members bearing them, into unity.

The dual function of the stringers, caps and spars as stress members and as carriers of key-engaging means is supplemented by that as carriers of abutment means for blocking and constraining the interlocked members against relative motion; as disclosed in all the embodiments herein, this means resides in positioning faces on each two adjoining stringers, caps or spars, placed in confronting relationship along the key therein; such faces may be borne either on opposed walls or shoulders astride the key, or they may be provided by recessed archways in the clearance spaces between the stringer, cap or spar protruding archways; in the latter case, the congruently interfitted protruding archways on two or more stringers, caps or spars become nested in the recessed archways on the associated member or members; such nested archways are most effective as blocking means if they are V-shaped, in which case the keys may be of a square cross-section. The effectiveness of confronting faces on the stringers, caps and spars in abutment with one another as the means for blocking them relatively immovably is increased by the use of a key capable of resilient deformation and confined in the archways in a constricted size whereby it exerts tension on the stringers, caps and spars and thereby draws them together with pre-loading forces into abutment with one another at their faces, as disclosed in my application for Airfoil Structure, Serial No. 708,339, filed January 9, 1958.

One result of such stringers, caps and spars interlocked and abutted relatively immovably is that they function as unitary stress members equivalent to the usual spars in airfoil structures fabricated piece-by-piece; moreover, the juxtaposed stringers so interlocked secure the shell panels together cohesively edge-to-edge at their parting line, and the opposed stringers so interlocked secure the shell panels together rigidly at one or more locations apart from the parting line in the face-to-face direction. In order to effect a union of the shell panels face-to-face at the parting line, it is a provision of my invention to make use of one of the stringers in juxtaposition by attaching it to the opposite inner sides of the closed extremity panel; such a stringer acting as a tie between the shell sides represents a spar; its web intervening transversely between the sides carries on it the key-engaging means and provides abutment faces therealong; these faces confront either the other stringer in juxtaposition alone, or such stringer and a lateral spar on a framework of stress members included between the panels or panel units, all confronting members being in joint engagement with the same key.

The foregoing structural principles of integrating closed and inaccessible bodies of airfoil and other shapes from individual panel units or subassemblies by means of linear keys, and holding them relatively immovably yet separably by stringers, caps and spars in abutment with one another along the keys, are applicable to a large variety of embodiments certain typical of which are shown in the drawings forming an integral part of this specification and are hereinfurther described with reference to those drawings.

In the drawings:

Fig. 1 is an exploded view of the components or subassemblies of a wing structure and of an aileron or flap pertaining to it.

Figs. 2 and 3 are fragmentary portions of a bulkhead from one of the subassemblies of Fig. 1, and show modified stringer profiles.

Fig. 4 is a profile view of a wing structure assembled from the subassemblies of Fig. 1.

Fig. 5 is an end view of two disassembled panel units and of a portion of a central spar from the wing shown in Fig. 6.

Fig. 6 represents a wing structure which includes a framework of stress members as an integral part of one of the panel units, two other panel units jointly forming one closed profile shell extremity and the other shell side.

Figs. 7 and 8 are detail views of alternative constructions of the central spar from the wing of Fig. 6.

Fig. 9 is a view of the underside of the two upper panel units and a cross-section through the central spar from the wing of Fig. 6, taken in the plane and direction indicated by 9—9 in Fig. 5.

Fig. 10 is an exploded view of the leading portion of two shell panel units and of a spar and a bulkhead attached thereto, pertaining to the wing of Fig. 11.

Fig. 11 shows the construction of a wing employing a unitary framework of spars and bulkheads in a two-panel shell, and of an aileron or flap also of a two-panel interlocked construction.

Fig. 12 is an exploded view of the fore portions of the panel units and of a hinge spar from the aileron or flap of Fig. 11.

Fig. 13 is an exploded view of the components of the wing and of its aileron or flap of Fig. 15, the latter unit being shown as partially assembled.

Fig. 14 is a cross-sectional view taken through one of the shell panel units of Fig. 13 in the plane 14—14 therein.

Fig. 15 is a wing assembly embodying the components of Fig. 13.

Fig. 16 represents an alternative configuration of the fore stress members in the wing of Figs. 13 and 15.

Fig. 17 is the front elevation of the wing shown in Fig. 18 with the root portion sectionalized along the line 17—17 in Fig. 18 to expose to view interior stress members and the wing juncture with a fuselage.

Fig. 18 is a plan view of a wing employing the construction of the airfoil of Fig. 4, with the dorsal wing and flap panels broken away to exhibit the interior components and their cojoining instrumentalities.

The structure of the wing shown in Figs. 1, 4, 17 and 18 includes two panel units 1 and 2 which form segments of an airfoil shell divided by a parting line 39 located spanwise at a distance from the shell closed profile end; in the shell interior is disposed a number of chordal bulkheads 3—7 at spanwise intervals which form a permanent unit or subassembly with the panel 2; of particular importance in this two-panel shell, both as stress members and as its assembling or cojoining means for the shell, are stringers which form integral parts of the panel units, and which are key-locked into unions; these stringer unions in cooperation with the bulkheads constitute the supporting members for the shell; the shell panels, braced by these stringer unions and bulkheads locally as well as in their span, participate with them in sustaining all the loads on the wing.

The bulkheads 3—7 extend on the panel unit 2 from its leading edge at the parting line 39 to its trailing edge and project beyond it as brackets mounting a bearing 11; on bulkheads 3—5 bearings 11 support hingeably a flap or air brake 12, and on bulkheads 6 and 7 an aileron 13. The bulkheads are I-beams with a vertical web 8 and contour flanges 9 and 10; the bottom flange 9 conforms to the contour of the ventral panel and is attached to it by any preferred process such as adhesive bonding or spot welding; the upper flange 10 follows a path spaced away from the dorsal panel 1 by a relatively small distance, and at intervals is formed with grooves 14; resting on and attached to this flange over the grooves, and connecting all the bulkheads cross-wise, are stringers 15—19.

Of these stringers, 16—19 are all of an identical profile characterized by lateral webs 20 and 21, coplanar shoulders 23 and 22, respectively, thereon and by a series of longitudinal archways 24 interrupted by clearance spaces or recesses 25 of a length and width somewhat greater than those of the archways. The fore stringer 15 has the same profile as the stringers 16—19 and has an additional flange 26 which rests on and is attached to the ventral panel 2 all along its leading edge under the bulkheads 3—7; these bulkheads together with the stringers 15—19 thereon constitute a unitary framework of supporting members for the shell, and with the integral ventral panel 2 represent a complete subassembly which can be fabricated with full accessibility of all the joined parts therein.

A modification of the stringer profile is shown in Fig. 2 and is intended to obviate relieving the stringer lateral webs 20 and 21 at intersections with the bulkheads; this is accomplished by turning the stringer webs, such as web 21a, upwardly so that they remain continuous in crossing the bulkheads; or, in a profile shown in Fig. 3, which calls for a reduced height of the bulkheads, the stringer lateral webs 29 and 30 are provided with flanges 27 and 28, respectively, which rest on and are secured to the bulkhead flange 10; frontal shoulders 31 and 32, and archways 24a on this type of stringer are duplicates of like elements in the stringer profile of Fig. 1.

The dorsal panel or panel unit 1 may be a single sheet or plate of material, or it may be spliced together from a number of narrower strips of stock, if necessary; it forms the whole dorsal shell side and is continuous around the leading profile end to the ventral side whereat it meets the panel 2 edge-to-edge at the parting line 39. Extending in the closed extremity portion of the panel 1 is a stringer 34, and at chordal intervals apart from it run spanwise stringers 35—38; the latter stringers are all of an identical profile which is substantially the same as that of the stringer in Fig. 3, and includes flanges 40 and 41 resting on and attached to the panel surface, lateral webs 42 and 43 standing on the flanges and supporting coplanar shoulders 44 and 45, and between them a series of archways 46 interrupted by clearance spaces. The profile of the closed extremity stringer 34 is identical in part with that of the stringers 35—38, its diversity residing in that its lateral web 47 is turned reversedly so that flange 48 along it rests on the ventral side of the panel 1 at and along its parting line edge; the flanges 33 and 48 of this stringer are thus based on the opposite inner sides of the same panel, in which respect this stringer represents a spar.

The stringers 34—38 on the panel unit 1 are in opposed alinement with the bulkhead stringers 15—19, respectively, and are paired with them in the matter of their archways and clearance spaces therebetween so that when the panel unit 1 is dropped into place over the bulkheads 3—7, the opposed stringers fall into confronting positions of their shoulders and their archways interfit congruently through their clearance spaces; tubular keys 80 are telescoped into the interfitted archways to interlock the stringers and through them the panel units 1 and 2 into a rigid and cohesive assembly by causing the stringers in each pair to abut each other at their shoulders; at the parting line 90, the stringer 34, functioning as a spar together with its mate 15 constrain the panels in edge-to-edge alinement as well as in their face-to-face relationship across the shell closed extremity.

For attaching a wing constructed in conformity with the foregoing disclosure to a fuselage or to a wing center section, the same devices as now used may be employed; one such device is shown in Figs. 17 and 18, and consists of brackets 49 and 50 secured in numbers to the panel units 1 and 2 at and along the inboard bulkhead 3; matching fittings 51 and 52 on a fuselage structure 53 and bolts 54 effect a demountable union. At the wing tip, a fairing cap 55 is fastened to the outboard bulkhead 7 in the usual manner.

The flap 12 and the aileron 13 embody the same structural principles as the wing which they conplement; as shown in Figs. 1, 4 and 18, the flap 12 consists of two halves, both nearly identical in shape and construction and analogous to the subassembly of the panel unit 2 and bulkheads 3—7 thereon in the wing; one half is made up of a shell panel 56 and ribs 57—62 on its inner side; similarly as the bulkheads in the wing, these ribs carry on them stringers for cojoining the two halves, three of the stringers 63, 64 and 65 being in spanwise alinement with one another and separated by gaps at the leading profile end of the flap; a continuous stringer 66 extends near the trailing end. The other or ventral half of the flap includes a panel 67, and a number of ribs 68 which coincide in plan view with the dorsal ribs 58—62; to these ribs is attached a stringer 69 and two other stringers in line with it which coincide in plan view with the stringers 63—65 in the dorsal half, and apart from them a continuous stringer 70. All of the fore stringers have a profile identical with the wing bulkhead stringers 16—19; the aft stringers 69 and 70 have each shoulders 71 and 72, and between these shoulders a series of interrupted archways 73; shoulder 71 and a flange 74 attach these stringers to the ribs and to the panels in their respective units. The opposed fore as well as the aft stringers in both shell subassemblies are matched in the spacing of their archways so that they interfit congruently and abut each other at their shoulders in the presence of keys 75 and 76 therein.

In this embodiment the key 75 performs a dual function in that it serves also as a hinge pin for the flap 12; to this end, the wing bulkheads 3—5 reach into the flap through gaps between the fore stringers 63—65 and their companion stringers in the ventral half, and the key 75 passes through the bulkhead bearing 11 and pivots in it.

The aileron 13 is constructed similarly as the flap 12 except in that being shorter, it embodies but two pairs of fore stringers 77 and 78; the key 81 in these stringers also serves to attach the aileron hingeably to the wing bulkheads 6 and 7.

In the wing structure of Fig. 6, a shell employing a divided dorsal panel unit is employed and stringers in the form of spars provide the principal stress members apart from the parting line. The shell air penetrating extremity and the dorsal side are provided by two panel units 88 and 89; these two units illustrate an expedient in cases where a single unit would be too large for fabrication or handling; substituting two or even more of narrower panel units for a single one is not a departure from the structural principles hereinabove disclosed which make it feasible and advantageous to use a single one; the same manner and means of uniting two or more of such panel units with the rest of the structure are employed as with a single unit, and the same results of open fabrication and ease of assembly obtain; only additional parts and another parting line are introduced into the structure which the basic two-panel shell does not require.

Of the two panel units 88 and 89 the first one provides the shell portion from a parting line 90 on the ventral side around the shell closed profile end to another parting line on the dorsal side, from which line the other panel unit completes the dorsal side rearwardly to the other shell end; both of these panel units have stringers at and along their spanwise edges by means of which they are secured into continuity with each other as well as with a ventral panel unit 87 and to the stress members on it. The panel unit 88 includes a fore spar 91 which is analogous to the stringer 34 in the wing of Figs. 1 and 4 in that it is based on the opposite inner shell sides by flanges 95 and 96, and bears interrupted archways 98 and shoulders 97 astride them. At and along the dorsal parting line the panel units 88 and 89 are provided with respective stringers 92 and 93, both of an identical profile which includes a flange 102, a lateral wall 103 with a shoulder 104 on it, another lateral wall 105 at the panel edge, and archways 106 between the shoulder and the latter wall; these archways and archways 107 on the companion stringer 93 overhang from one half the panel edge. Clearance spaces which interrupt the archways are, as shown in Fig. 9, three times as long as the archways, and the archways are shifted on each stringer so that when the two panel units 88 and 89 meet edge-to-edge, their stringers come into confronting positions of their walls 105, and their archways 106 and 107 interfit side-by-side and leave a vacant space next to them between their shoulders 104; in all of these features the combined stringers 92—93 represent an equivalent of an individual stringer, such as 94 at the aft edge of the panel unit 89; this stringer is in turn analogous to any one of the stringers 35—38 of Fig. 1 in that it has attaching flanges 99, two shoulders 100 on lateral walls based on the flanges, and interrupted archways 101.

The ventral panel unit 87 in this embodiment has a stringer 82 based on it at and along the parting line 90, and apart from it two other stringers in the form of spars 83 and 84, with respective attaching flanges 109 and 110, webs standing on the flanges and reaching across the shell to the proximity of its dorsal side and carrying profile caps therealong. The stringer 82 and the caps on the spars 83 and 84 are formed with instrumentalities which are duplicate of and complemental to those on the stringers 91 and 94, and on the combined edge stringers 92—93, and which consist essentially of two shoulders astride a series of interrupted archways 111; these archways are shifted in relation to those on the stringers on the dorsal panel units so that when these units are dropped into position, the archways on the opposed stringers and spars interfit congruently and the shoulders alongside them assume confronting positions, and become abutted against one another when tubular keys 112 are telescoped into the archways.

Extending chordwise between the stringer 82 and spars 83 and 84 and buttressing them laterally are bulkheads 85 and 86; these bulkheads together with the stringer and the spars constitute a framework of supporting members which is integral with the panel unit 87 as a subassembly producible with full accessibility.

The archways and the shoulders on the spars 83 and 84, instead of being integral portions milled out of the spar caps as shown in Fig. 6, may be made separately and attached to the spars; examples of this construction are shown in Figs. 7 and 8; the cap of the spar 83a consists of a stringer 113 which is of the same profile as the stringer in Fig. 3 and rests on angle shapes secured to the spar web; the cap of the spar 83b is provided from a part by the spar itself, and the part with the protruding archways by a stringer 114 which is similar to the stringers 16—19 of Fig. 1. Irrespective of the detail construction of the stringers and spars, each two, or each three of them as in the case of the central ones in Fig. 6, are drawn by their key-engaging means as represented by the archways into abutment with each other at their confronting faces as provided by the shoulders or by the lateral walls at the parting lines, so that they function as a unitary stress member or spar in the wing of Fig. 6 as well as in all the other embodiments herein disclosed.

The structures of both the wing and the aileron or flap of Fig. 11 are distinguished by the same novel features as the foregoing embodiments as well as by others and original ones; the structure of the wing is notable in that the framework of stress members in it is attached separably to both of the shell panel units 115 and 116; the framework consists of three spars 117, 118 and 119, and of bulkheads 124 and 125 extending between them and abutting them; furthermore, the aft spar 119 has a number of hinge brackets, such as 126, attached to it at substantially the same locations as the bulkheads for mounting pivotally an aileron or a flap. Of the three spars, the fore one 117 is of a channel profile defined by lateral webs, two convergent shoulders on them, and a series of interrupted archways protruding from the shoulders, and resembles the profile of the stringers 16—19 of Fig. 1; the spars 118 and 119 are both I-beams of composite construction, carrying on their flanges caps 120 and 121, and caps 122 and 123, respectively, all of which have a profile identical with that of the cap 114 of Fig. 6.

The shell in this wing is formed by a panel unit 115 which provides the dorsal side, the fore profile extremity, part of the ventral side, and meets the other or ventral panel unit 116 at a parting line 127 distanced from that extremity. In the fore portion of the panel unit 115 extends a stringer 128 the profile of which is similar to the stringer 34 of Fig. 1 and is virtually a spar since its flanges 137 and 138 are based on the opposite inner sides of the panel unit 115, and has intervening walls 139, 140 and 141 and interrupted archways 142 carried by them. At intervals apart from the spar 128 extend stringers 129 and 130 in opposed alinement with the spar caps 120 and 122, respectively.

The ventral panel unit 116 has a stringer 131 extending on it at and along the parting line 127, and two stringers 132 and 133 in opposed alinement with the spar bottom caps 121 and 123, respectively. The profile of the edge stringer 131 includes a shoulder 134 on a lateral wall, as shown in Fig. 10, and interrupted archways 136 supported by that shoulder and by another lateral wall 135. The profile of the dorsal and ventral panel stringers 129, 130, 132 and 133 is similar to that of the stringers 35—38 of Fig. 1.

When the panel units 115 and 116 are placed in position on the inner framework, their stringers 128 and 131 at the parting line interfit with each other into a confronting relationship of the wall 141 with the shoulder 134, and their walls 139 and 135 confront the convergent shoulders on the spar 117; the other panel stringers 129, 130, 132 and 133 confront with their shoulders those on the respective spar caps 120, 122, 121 and 123, and all of them become parts of a rigid structure when tubular keys 143 are slid into the interfitted stringer, spar and cap archways.

The aileron or flap hinged to the brackets 126 in the wing of Fig. 11 relies on unions of interlocked stringers to function as spars therein; its shell comprises panel units 144 and 145 which meet at two parting lines 147 and 152; the dorsal panel unit 144 forms the closed aft profile extremity of the shell and a portion of the ventral side, and in the closed extremity includes a stringer or spar 151 which is based on the opposite inner sides of the panel unit and is a duplicate of the spar 34 of Fig. 1; its companion stringer 149 corresponds in profile to the stringers 35—38 of the same figure.

The fore pair of stringers 148—150, shown disassembled in Fig. 12, is made up of profiles analogous to 131 in Fig. 10, the reason being that the stringers in this pair are associated with a lateral spar 153 in the same manner as stringers 131—128 are with the spar 117. The profile of the spar 153 is a channel section with walls 154 and 155 forming a V-shape between the inner faces of which are secured brackets 156 which are hinged to the wing brackets 126; the outer faces on the spar 153 confront the lateral walls 135a—135b of the stringers 150—148 while these stringers confront each other at their shoulders 134a—134b; stringer archways 136a and 136b interfit with one another as well as with archways 157 on the spar, and tubular key 143a in engagement with the archways of all three members causes them to block one another relatively immovably at their confronting walls and shoulders.

The airfoil structure of Figs. 13 and 15 differs from the preceding one mainly in that two individual spars rather than a unitary framework represent the principal supporting stress members; the function of the bulkheads of the preceding embodiments is performed in this case by chordwise ribs or stiffeners 160 applied to the inner side of the panel units 161 and 162 in the manner shown in Fig. 14. Of these panel units, the dorsal one 161 is continuous around the airfoil fore extremity and meets the ventral unit 162 at a spanwise parting line 163 in the proximity of that extremity; at and along the parting line the panel units are provided with respective stringers 158 and 159, and apart from them with identical stringers 166—167 in midsection, and with stringers 168 at the trailing edges, the two last named types being of the same profile as the stringers 35—38 of Fig. 1 with a modification in that the twin stringers 166—167 on each panel unit are connected by a corrugated web 169 to form a single member.

The stringer 158 in the closed profile extremity of the shell is based by flanges 190 and 191 on the opposite inner shell sides in the manner of a spar, and has walls 192 and 193 intervening between them and supporting interrupted archways 194; a reinforcing web 195 between the flange 191 and flange 196 may be embodied in the profile of this spar. The companion stringer 159 extends on the panel unit 162 in juxtaposition to the spar 158, and has spaced apart flanges 197 and 198, lateral walls 199, 201 and 200 converging to form a triangular profile, and interrupted archways 202 protruding between the walls 199 and 201 congruently with those on the spar 158.

The individual spars 164 and 165 are both of box construction and bear key-engaging and abutment means in opposite compatible alinement with the respective panel unit stringers 166—167 and 168 on both the dorsal and ventral side; the central spar 164 is built up of side webs 171 and 172, each provided with marginal flanges 173 and 174, and of chord webs 175 and 176 attached to these flanges; in each chord web run two sets of interrupted archways 177 and 178 which are congruent with those on the stringers 166—167. The aft spar 165 is of the same box construction as the central one, its body consisting of side webs 179 and 180, and caps such as 181 with interrupted archways 182 and 183, respectively, on them and congruent with those on the stringers 168 on both panel units.

In the assembled wing, the opposite stringers and webs on the respective panel units 161, 162 and spars 164, 165 confront one another alongside the interfitted sets of archways thereof, and the juxtaposed spar 158 and stringer 159 confront each other at their lateral walls 192—199 and 193—201 alongside their interfitted archways; the confronting stress members are drawn into abutment with one another by tubular keys 184 entered into their interfitted archways, and function as unitary supporting members for the wing.

A configuration of the spar and stringer in the fore profile extremity of the wing alternative to that in Figs. 13 and 15 is represented in Fig. 16; the spar 204 and the stringer 205 have a profile which corresponds to the spar and the stringer 91—82 of Figs. 5 and 6 with the distinction in that the former parts are of sheet material instead of being of solid cross-section. A further modification is represented by dot-and-dash lines 206, 207 and 208 which indicate upright walls and a flange between them as additional bracing elements for the spar 204 and for the dorsal panel.

The aileron or flap pertaining to the wing of Figs. 13 and 15 is a modified construction of the one in Fig. 11, the modification relating to the manner of its pivotal attachment to the wing; it comprises panel units 185 and 186, of which the dorsal one, 185, forms also the trailing airfoil extremity by including a portion 188 on the ventral side and meets the other panel unit at a parting line 211 distanced from that extremity. The stress members on the panel units consist of a stringer 209 in the form of a spar based on the opposite inner sides of the closed extremity panel unit 185, and a stringer 210 based on the other panel unit 186 in confronting relationship of its shoulders with the web of the spar 209; in the fore airfoil extremity of the shell extends a pair of opposed stringers 187—189, one on each of the panel units, and both of an identical profile; this profile includes the characteristic shoulders astride a series of interrupted archways, the shoulders of each stringer confronting those of the other stringer; two keys such as 212 interlock both panel units and their stringers and spar into unity; the key in the fore stringers functions also as a hinge pin by being mounted on the brackets 203 in the wing, similarly as the aileron in the wing of Fig. 4. The two-panel unit shell construction and the particular stress members therein as disclosed in the aileron of Fig. 13, same as those in Figs. 4 and 11, are equally well applicable to any other airfoil body, such as to a wing, it being immaterial whether the closed airfoil extremity of the shell is its leading or trailing one.

I claim:

1. In a structure, two panels forming complemental portions of a shell of an elongated profile, one of said panels forming a closed profile end of said shell and meeting the other panel at a lengthwise parting line located remotely from said closed profile end, a linear key extending in said shell along said parting line, stress members extending on both of said panels at and along said parting line and bearing means holding slidably onto said key in conjunction with each other, one of said stress members having a wall based on the opposite inner sides of said closed end panel and bearing said key-holding means on said wall.

2. In a structure, two panel units forming each a portion of an elongated shell, one of said panel units forming one side and a closed profile end of said shell and meeting the other panel unit at a lengthwise parting line located remotely from said closed profile end, lengthwise key-locked pairs of stress members extending on said panel units in said shell one at and along said parting line and one or more apart therefrom for securing said panel units to each other detachably both edge-to-edge and face-to-face at said parting line and face-to-face apart therefrom, and means on said stress members for constraining them relatively immovably in said key-locked pairs thereof.

3. In a structure, two panel units forming each a portion of an elongated shell, one of said panel units forming one side and a closed profile end of said shell and meeting the other panel unit at a lengthwise parting line located remotely from said closed profile end, lengthwise key-locked stress members on said panel units in said shell at and along said parting line securing said panel units together detachably edge-to-edge and face-to-face thereat, one or more of spars extending on one of said panel units apart from said parting line and reaching to the proximity of the other panel unit, a stress member on said other panel unit in alinement with each of said one or more spars, lengthwise key-locked means on each spar and on said stress member in alinement therewith for securing said panel units together detachably face-to-face, and means on said parting line stress members and on each spar and on said stress member in alinement therewith for constraining them relatively immovably.

4. In a structure, two panel units forming each a portion of an elongated shell, one of said panel units forming one side and a closed profile end of said shell and meeting the other panel unit at a lengthwise parting line located remotely from said closed profile end, lengthwise key-locked stringers on said panel units in said shell at and along said parting line securing said panel units together detachably edge-to-edge and face-to-face thereat, a spar extending in said shell apart from said parting line, stringers on both of said panel units in alinement with said spar, lengthwise key-locked means on said spar and on said stringers in alinement therewith for securing said panel units and spar together detachably face-to-face, one of said stringers at and along said parting line having a wall based on the opposite inner sides of said closed profile end panel unit and being key-locked to the other stringer at said wall.

5. In a structure, two panel units forming each a portion of an elongated shell, one of said panel units forming one side and a closed profile end of said shell and meeting the other panel unit at a lengthwise parting line located remotely from said closed profile end, a spar extending in said shell at and along said parting line, one or more of spars extending apart from said parting line, bulkheads interconnecting said spar at said parting line with said one or more spars apart therefrom, lengthwise key-locked stress members on said panel units in said shell at and along said parting line securing said panel units together detachably edge-to-edge and face-to-face thereat, means on said spar at said parting line for key-locking it together with said stress members, stress members on both of said panel units in alinement with each of said one or more spars apart from said parting line, and lengthwise key-locked means on said one or more spars and on said stress members in alinement therewith for securing said panel units and spars together detachably.

6. In a structure, two panel units forming each a portion of an elongated shell, one of said panel units forming one side and a closed profile end of said shell and meeting the other panel unit at a lengthwise parting line located remotely from said closed profile end, chordal bulkheads extending at lengthwise intervals on one of said panel units from said parting line to the shell other profile end, and pairs of lengthwise key-locked stress members extending one member of each pair on said bulkheads and the other member on the other panel unit, one pair extending at and along said parting line and other pairs extending apart therefrom and from each other, said key-locked stress members securing said panel units together detachably edge-to-edge and face-to-face at said parting line and face-to-face apart therefrom.

7. In a structure, two panel units forming each a portion of a shell of an elongated profile having a closed profile end, said panel units meeting each other at a lengthwise parting line at said closed profile end, linear keys extending in said shell one at and one along said parting line and at each of one or more intervals apart therefrom, stringers as integral parts of said panel units extending in opposed alinement with each other at and along said parting line and at intervals apart therefrom and bearing means in slidable engagement of said keys jointly with each other, and ribs extending on said panel units crosswise of said stringers and forming a unitary framework with said stringers.

8. In a structure, two panel units forming each a portion of a shell of an elongated profile, one of said panel units forming one side of said shell and a closed profile end thereof and meeting the other panel unit on the opposite side at a lengthwise parting line remote from said closed profile end, stringers extending on both of said panel units in pairs located one at and along said parting line and at one or more intervals apart therefrom, chordal bulkheads extending on at least one of said panel units and abutting said stringers thereon and with said stringers forming an internal supporting framework for said shell, and a linear key telescoped in between each pair of said stringers, said stringers bearing means for a slidable engagement with said key, one of said stringers at and along said parting line being based on the opposite inner sides of said closed-end panel unit for bearing said key engagement means intermediate said sides and supporting said closed profile end on said framework by said keyed engagement jointly with the other stringer on the other panel unit.

9. In a structure, two panel units forming jointly an airfoil shell and stress members therein, one of said panel units being continuous around one shell profile end of said shell and meeting the other panel unit at a spanwise parting line remote from said closed profile end, stringers extending on said panel units in juxtaposition to each other at and along said parting line, one of said stringers being based on the opposite inner sides of said continuous panel unit at said closed profile end and intervening therebetween, stringers extending on said panel units in opposition with each other apart from said parting line, linear keys interposed one between said stringers in juxtaposition and one between each two of said stringers in opposition, and means carried on said stringers for engaging said keys slidably jointly with each other.

10. In a structure, components and their relationships as set forth in claim 9, two of said stringers in opposition with each other furthest apart from said parting line having the divergent faces thereon on the lateral side away from said parting line, a spar extending between said stringer divergent faces and carrying hinge brackets thereon for attaching said shell pivotally to another airfoil shell, and means carried on said spar for engaging said key jointly with said stringers in opposition.

11. In a structure, components and their relationship as set forth in claim 10, a spar disposed in confronting position of both of said stringers at and along said parting line, said spar bearing means for joint slidable engagement of said key between said stringers and bearing means for constraining itself immovably relatively to said stringers by said key engagement thereof, and chordal bulkheads at spanwise intervals interconnecting said spar at said parting line stringers and said spars apart from said parting line with one another.

12. In a structure, two panel units forming each a portion of an airfoil shell, one of said panel units forming a closed profile end of said shell and meeting the other panel unit at a spanwise parting line remote from said closed profile end, stringers extending on said panel units at and along said parting line in confronting position of each other, one of said stringers being based on the opposite inner sides of said closed profile end panel unit and intervening between said sides, stringers extending on said panel units at intervals apart from said parting line, spars disposed in said shell interjacent said stringers apart from said parting line in confronting positions of said stringers on both panel units, and linear keys interposed one between said confronting stringers at said parting line and one between each of said confronting spars and stringers, said confronting stringers and said confronting spars and stringers bearing means for joint slidable engagement with said keys and bearing means for constraining each other relatively immovably by said engagement thereof with said keys.

13. In a structure, two panel units forming each a portion of a shell of an elongated profile, one of said panel units forming one closed profile end and one side of said shell and meeting the other panel unit on the other side at a lengthwise parting line remote from said closed profile end, supporting members for said shell disposed therein, means attaching said supporting members to one of said panel units, linear keys extending one at and along said parting line and one at each of a number of intervals apart therefrom intermediate said supporting members and the other one of said panel units, stringers on said panel units at and along said parting line, and a stringer on said other panel unit along each of said number of keys apart from said parting line, said stringers at said parting line bearing means for engaging slidably said one key thereat jointly with each other, said supporting members and said stringer along each of said number of keys apart from said parting line bearing means for slidably engaging one of said number jointly with each other, one of said stringers at said parting line having walls based on and intervening between the opposite inner sides of said closed end panel unit and bearing said key-engaging means thereon.

14. In a structure, components and their relationships as set forth in claim 13, said means attaching said supporting members to one of said panel units including means on said supporting members for engaging slidably said one key at said parting line jointly with said stringers thereat, linear keys extending one at each of a number of intervals apart from said parting line intermediate said supporting members and said one panel unit, and a stringer on said panel unit along each of said keys apart from said parting line, said supporting members and said stringer along each of said keys bearing means for engaging slidably each of said keys jointly with each other.

15. In a structure, two panel units forming each a portion of a shell of an elongated profile, one of said panel units forming one closed profile end and one side of said shell and meeting the other panel unit on the other side at a lengthwise parting line remote from said closed profile end, a number of chordwise bulkheads having contour flanges thereon and being disposed at lengthwise intervals in said shell, means attaching said bulkheads to one of said panel units by one of said flanges thereof, the other flange following a path spaced away from the other one of said panel units from said parting line on throughout the extent thereof, linear keys extending intermediate said bulkhead flange and said other panel unit one at and along said parting line and one at each of a number of intervals apart therefrom, stringers on said bulkhead flange forming a part of the panel unit thereof and bearing means for engaging said keys slidably, and stringers on said other panel unit in opposition to said bulkhead stringers and bearing means for engaging said keys slidably jointly therewith, the one of said bulkhead stringers at said parting line being based on the panel unit thereof at and along said parting line, the one of said stringers on the other panel unit at said parting line being based on and intervening between the opposite inner sides of said closed end formed by said panel unit.

16. In a structure, two panel units forming each a portion of a shell of an elongated profile, one of said panel units forming one closed profile end and one side of said shell and meeting the other panel unit on the other side at a lengthwise parting line remote from said closed profile end, stringers based on said panel units at and along said parting line in confronting positions of each other, one of said stringers being based on and intervening between the opposite inner sides of said panel unit forming said closed profile end, stringers based on both of said panel units at intervals apart from said parting line in confronting positions of each other, said stringers on one of said panel units having a height reaching across said shell and confronting said stringers on the other panel unit in close proximity of said unit, linear keys interposed between said confronting stringers at said parting line and apart therefrom, said confronting stringers bearing means for engaging said keys slidably jointly with each other, and chordal bulkheads based on said panel unit having said stringers reaching across said shell thereon and abutting said stringers and forming a unitary framework therewith.

17. In a structure, two panel units forming each a portion of a shell of an elongated profile, one of said panel units forming one closed profile end and one side of said shell and meeting the other panel unit on the other side at a lengthwise parting line remote from said closed profile end, a spar extending lengthwise in said shell apart from said parting line, stringers based on said panel units at and along said parting line in juxtaposition to each other, one of said stringers being based on and intervening between the opposite inner sides of said closed end panel unit to provide a spar therein, stringers based on said panel units in opposition to said spar extending apart from said parting line, linear keys interposed one between said stringers in juxtaposition and one between said spar and each of said stringers in opposition thereto, said stringers in juxtaposition and said spar and stringers in opposition thereto bearing means for engaging said keys jointly with each other, and chordal ribs extending on each of said panel units between said stringers based thereon and abutting said stringers for transferring thereinto and into said spar stresses induced by forces against said panel units.

18. In a structure, two panel units forming each a portion of a shell of an elongated profile, one of said panel units forming one closed profile end and one side of said shell and meeting the other panel unit on the other side at a lengthwise parting line remote from said closed profile end, a spar extending in said shell at and along said parting line, another spar extending in said shell apart from said parting line, chordal bulkheads interconnecting said spars at lengthwise intervals, stringers based on said panel units in juxtaposition to each other and to said spar at and along said parting line, one of said stringers being based on and intervening between the opposite inner sides of said closed end panel unit, stringers based on said panel units in opposition to said spar apart from said parting line, linear keys interposed between said stringers and spar in juxtaposition and between said spar and stringers in opposition thereto, said stringers and spar in juxtaposition and in opposition bearing means for engaging said keys slidably jointly with each other.

19. In a structure, two panel units forming each a portion of a shell of an elongated profile, one of said panel units forming one closed profile end and one side of said shell and meeting the other panel unit on the other side at a lengthwise parting line remote from said closed profile end, a unitary framework of chordwise and lengthwise supporting members disposed in said shell, means attaching one of said panel units to said framework, linear keys extending in said shell one at and along said parting line and one at each of a number of intervals apart therefrom intermediate said framework and the other one of said panel units, means on said framework lengthwise members for slidably engaging said keys at said parting line and apart therefrom, stringers extending in juxtaposition to each other on said panel units at and along said parting line, and stringers extending on said other panel unit in opposition to said framework lengthwise members, said stringers bearing means for engaging said keys slidably jointly with each other and with said framework member means at said parting line and jointly with said framework members means apart therefrom.

20. In a structure, two panels forming each a portion of an airfoil shell, the first of said panels being continuous from one shell side around a closed profile end of said shell to the other side and meeting the other panel at a parting line distanced from said closed end, two stringers extending on said panels at and along said parting line, a linear key interposed between said stringers, said stringers bearing lengthwise interrupted archways and having said archways interfitted congruently with each other and engaging said key therewith, one of said stringers having means attaching it to said other panel, and the other stringer having means attaching it to the opposite inner sides of said closed end panel and having walls intervening between said sides and bearing said archways thereon.

21. In a structure, components and their relationships as set forth in claim 20, faces on said stringers in confronting positions of each other alongside said archways thereof, said stringers being held in abutment against each other at said faces by said key in engagement with said archways thereof.

22. In a structure, two panel units forming portions of a shell having at least one closed profile end, the first of said panel units forming one shell side and said closed profile end and meeting the other panel unit at a lengthwise parting remote from said closed profile end, chordal bulkheads extending at lengthwise intervals on said other panel unit from said parting line to the other shell profile end, stringers extending crosswise of said bulkheads and being secured thereto one at and along said parting line and others at chordal intervals apart therefrom, stringers extending on said first panel unit one in opposition to each of said stringers on said other panel unit, linear keys interposed between said stringers in opposition, means on said stringers for engaging said keys slidably jointly with each other, one of said stringers on said first panel unit at and along said parting line having means securing it to the opposite inner sides of said closed profile end and having a wall intervening between said securing means and bearing said key-engaging means on said wall.

References Cited in the file of this patent

UNITED STATES PATENTS

| | | |
|---|---|---|
| 1,988,085 | Orlando | Jan. 15, 1935 |
| 2,473,728 | Rutledge | June 21, 1949 |
| 2,483,134 | Gitz et al. | Sept. 27, 1949 |

OTHER REFERENCES

Oeckl et al.: Serial No. 306,424 (A.P.C.), published May 25, 1943.